United States Patent
Tickoo et al.

(10) Patent No.: US 9,471,886 B2
(45) Date of Patent: Oct. 18, 2016

(54) CLASS DISCRIMINATIVE FEATURE TRANSFORMATION

(71) Applicant: Raytheon BBN Technologies Corp., Cambridge, MA (US)

(72) Inventors: Manasvi Tickoo, Cambridge, MA (US); Devansh Arpit, Buffalo, NY (US); Xiaodan Zhuang, Somerville, MA (US); Walter Andrews, Sudbury, MA (US); Pradeep Natarajan, Lexington, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 44 days.

(21) Appl. No.: 14/459,242

(22) Filed: Aug. 13, 2014

(65) Prior Publication Data

US 2015/0117766 A1      Apr. 30, 2015

Related U.S. Application Data

(60) Provisional application No. 61/897,148, filed on Oct. 29, 2013.

(51) Int. Cl.
| | |
|---|---|
| G06K 9/00 | (2006.01) |
| G06N 99/00 | (2010.01) |
| G06K 9/46 | (2006.01) |
| G06K 9/62 | (2006.01) |

(52) U.S. Cl.
CPC ........... *G06N 99/005* (2013.01); *G06K 9/6235* (2013.01); *G06K 2009/6236* (2013.01)

(58) Field of Classification Search
None
See application file for complete search history.

(56) References Cited

U.S. PATENT DOCUMENTS

| | | | | |
|---|---|---|---|---|
| 2006/0161403 A1* | 7/2006 | Jiang | ....................... | G06F 17/18 703/2 |
| 2013/0325759 A1* | 12/2013 | Rachevsky | .......... | G06N 99/005 706/12 |

OTHER PUBLICATIONS

Huang, Gary B. et al.; "Labeled Faces in the Wild: A Database for Studying Face Recognition in Unconstrained Environments"; University of Massachusetts; Amherst; Technical Report 07-49; Oct. 2007; 11pp.
Li, Haoxiang et al.; "Probabilistic Elastic Matching for Pose Variant Face Verification"; Computer Vision and Pattern Recognition (CVPR); 2013; 8pp.
Mendez-Vazquez, Heydi et al.; "Volume Structured Ordinal Features with Background Similarity Measure for Video Face Recognition"; International Conference on Biometrics (ICB); 2013; 6pp.
Shewchuk, Jonathan Richard et al.; "An Introduction to the Conjugate Gradient Method Without the Agonizing Pain"; Technical Report CMU-CS-TR-94-125; Carnegie Mellon University; 1994; 64pp.
Vedaldi, Andrea et al.; "VLFeat—An open and portable library of computer vision algorithms"; MM '10; Oct. 25-29, 2010; Firenze, Italy; 4pp.
Wolf, Lior et al.; "Face Recognition in Unconstrained Videos with Matched Background Similarity"; IEEE Conf. on Computer Vision and Pattern Recognition (CVPR); 2011; 6pp.
Ye, Jieping; "Least Squares Linear Discriminant Analysis"; Proceedings of International Conference on Machine Learning; 2007; 8pp.

\* cited by examiner

*Primary Examiner* — David F Dunphy
(74) *Attorney, Agent, or Firm* — Lewis Roca Rothgerber Christie LLP

(57) ABSTRACT

A method for feature transformation of a data set includes: receiving a data set including original feature samples with corresponding class labels; splitting the data set into a direction optimization set and a training set; using the direction optimization set to calculate an optimum transformation vector that maximizes inter-class separability and minimizes intra-class variance of the feature samples with respect to corresponding class labels; using the optimum transformation vector to transform the rest of the original feature samples of the data set to new feature samples with enhanced discriminative characteristics; and training a classifier using the new feature samples, wherein the method is performed by one or more processors.

6 Claims, 2 Drawing Sheets

CLASS DISCRIMINATIVE FEATURE TRANSFORMATION

CROSS-REFERENCE TO RELATED APPLICATIONS

This Patent Application claims the benefits of U.S. Provisional Patent Application Ser. No. 61/897,148, filed on Oct. 29, 2013, and entitled "A Novel Feature Normalization Technique," the entire content of which is hereby expressly incorporated by reference.

FIELD OF THE INVENTION

The present invention relates generally to data processing and feature extraction; and more particularly to a system and method for feature transformation of data sets.

BACKGROUND

In data processing, feature extraction is a special form of dimensionality reduction that effectively represents the interest points in a feature vector. When the input data to a process (algorithm) is too large to be processed and it includes some redundancy, the input data may be transformed into a reduced representation set of features, i.e., a feature vector. If done properly, the features set includes the relevant information from the input data to perform the desired task using the reduced representation by the feature vectors. Feature extraction techniques simplify the amount of data required to describe a large set of data accurately.

Feature extraction has been widely used in image processing and optical character recognition which use different algorithms to detect and isolate various features of a dataset, for example, digitized image, video stream, speech, or text. In a typical pattern recognition problem, feature extraction is followed by classification which is a method of identifying to which of a set of categories (classes) a new observation belongs, on the basis of a training set of data containing observations (or instances) for which their category is already known.

In the context of machine learning, supervised classification is considered an instance of learning, where a training set of correctly identified observations (features) is available (training set). On the other hand, the unsupervised procedures such as clustering, comprise of grouping data into categories based on some measure of inherent similarity. For example, the distance between instances, considered as vectors in a multi-dimensional vector space. In machine learning, the observations are often known as instances, the explanatory variables are termed features and the possible categories to be predicted are classes.

A common subclass of classification is probabilistic classification. Algorithms of this nature use statistical inference to find the best class for a given instance. Unlike other algorithms, which simply output a best class, probabilistic algorithms output a probability of the instance being a member of each of the possible classes. Typically, the best class is then selected as the one with the highest probability.

Classification and clustering are examples of the more general problem of pattern recognition, which is the assignment of an output value to a given input value. Other examples are regression, which assigns a real-valued output to each input; or sequence labeling, which assigns a class to each member of a sequence of values, for example, part of speech tagging, which assigns a part of speech to each word in an input sentence.

A training set is a set of data used to discover potentially predictive relationships. In the machine learning field, a training set includes an input feature vector and a corresponding label vector, which are used together with a supervised learning method to train a knowledge database. In statistical modeling, a training set is used to fit a model that can be used to predict a "response value" from one or more "predictors." The fitting can include both variable selection and parameter estimation. Statistical models used for prediction are often called regression models, of which linear regression and logistic regression are two examples.

Typically, emphasis is placed on avoiding overfitting of the training set, so as to achieve the best possible performance on an independent test set that approximately follows the same probability distribution as the training set. A training set is often used in conjunction with a test set, which is a set of data used to assess the strength and utility of a predictive relationship that is using the learned parameters to predict and compare the accuracy.

Measuring the distance between high-dimensional feature vectors arises in several computer vision tasks and other similar pattern recognition applications. Mahalanobis distance appears naturally in classification tasks where we want samples from the same class to be close and samples from different class to be well separated. Multiple approaches have been proposed for metric learning within this framework, including formulations based on maximizing absolute or relative distances between dissimilar data points, nearest neighbors, largest margin nearest neighbors, and Within Class Covariance Normalization (WCCN). These methods depend on a full rank non-diagonal matrix and computationally intense operations such as matrix inverse, and thus, become intractable for high dimensional data.

In order to avoid the typical complexities of dimensionality, several feature selection techniques have been proposed. The most popular ones include unsupervised techniques such as Principal Component Analysis (PCA) which aims to find a linear feature subspace that minimizes the reconstruction error. Likewise, the supervised dimension reduction techniques, such as Fisher Linear Discriminant Analysis (FLDA) that finds subspace that maximizes inter-class separation and minimizes intra-class separation. Dimensionality Reduction makes some directions degenerate, hence omitting those directions. On the other hand, in feature transformation techniques such as WCCN, the feature space remains same but the transformation results in suppressing (or strengthening) of some directions corresponding to an optimal distance criterion.

Accordingly, there is a need for a computationally efficient feature transformation technique that is less complex, computationally feasible and scales linearly with dimensionality of the vectors.

SUMMARY

In some embodiments, the present invention is a method for feature normalization with a computationally efficient class discriminative feature transformation for highly accurate classification results. The invention provides an efficient class discriminative feature transformation system that provides an improved feature transform that maximizes inter-class separability and minimizes the intra-class variance. In some embodiments, the present invention operates independently of the data type and data dimension and is capable of exploiting the limited amounts of training data while preserving full feature dimensionality. In some embodiments, the present invention scales linearly with the dimension of the given high-dimensional feature vector.

In some embodiments, the present invention is a computer implemented method for feature transformation of a data set. The computer implemented method includes: receiving a data set including original feature samples with corresponding class labels; splitting the data set into a direction optimization set and a training set; using the direction optimization set to calculate an optimum transformation vector that maximizes inter-class separability and minimizes intra-class variance of the feature samples with respect to corresponding class labels; using the optimum transformation vector to transform the rest of the original feature samples of the data set to new feature samples with enhanced discriminative characteristics; and training a classifier using the new feature samples, wherein the method is performed by one or more processors.

In some embodiments, a conjugate gradient descent based least square method is used to calculate the optimum transformation vector.

In some embodiments, the optimum transformation vector is used to transform the original feature samples of the data set while maintaining the same dimensionality.

In some embodiments, the optimum transformation vector is calculated by: learning a class discriminative projection vector using a Fisher Linear Discriminant Analysis (FLDA) criterion; projecting the original feature samples such that the feature directions along the projection vector are maximized while other directions are minimized while maintain the dimensionality to obtain new discriminative features; and learning a Support Vector Machine (SVM) based classifier on said new discriminative features.

DETAIL DESCRIPTION

In some embodiments, the present invention takes a novel data-driven approach to automatically learn a (dis)similarity distance metric. Aimed at tackling the fundamental problem of similarity measurement in pattern recognition problems, a novel supervised feature transformation technique, hereby called Class Discriminative Feature Transform (CDFT) is developed. The principle behind CDFT is to maximize the between-class separability and suppress the variance of the data in the directions that are not discriminative. According to some embodiments of the invention, a subset of training data is used to compute the direction vector that simultaneously maximizes the between-class mean distance and minimizes the intra-class variance using the Fisher's Linear Discriminant Analysis (FLDA) criterion. This vector is then used for transforming the features in their original space to enhance their discriminative power.

J. Ye, "Least squares linear discriminant analysis", Proceedings of International Conference on Machine Learning, 2007 ([1]), the entire content of which is hereby expressly incorporated by reference, showed how Linear Discriminant Analysis (LDA) can be formalized as a linear regression problem with mean-centered class labels. In some embodiments, the present invention extends this approach by using the optimal class-discriminative vector to transform the features at hand to increase the relative variance of the data along this direction, while suppressing other directions in the feature space. (See, for example, Eq. 9 below).

The processes according to the present invention may be executed by one or more processors, such as a general purpose, special purpose computer or one or more server computers, using software, firmware or a combination thereof.

In some embodiments, the present invention performs unconstrained face verification in four main steps. First, low level features are extracted. Next, a transform that maximizes inter-class separability and minimizes intra-class variance. Then this transform is used to transform the original feature vectors enhancing the discriminative power along the class discriminative transformation vector while maintaining full dimensionality. Finally, a binary Support Vector Machine (SVM) classifier is learned at the training stage.

Figure 1:
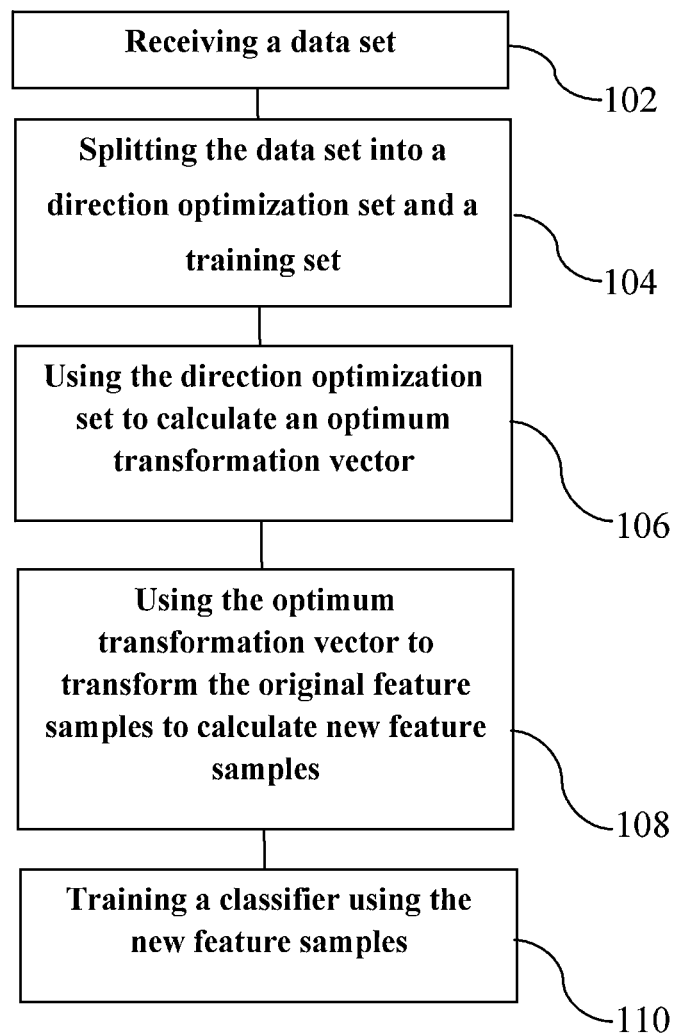
FIG. 1 is an exemplary process flow, according to some embodiments of the present invention.

FIG. 1 is an exemplary process flow, executed by one or more processors, according to some embodiments of the present invention. As shown in block 102, a data set is received. The data set may be ground-truth labelled image, speech, text, etc. samples represented in turn by corresponding feature vectors. The data set at hand is then randomly split into a direction optimization set and a training set, in block 104, typically in a 1:10 ratio respectively. In block 106, the invention then uses the direction optimization set to calculate an optimum transformation vector that maximizes inter-class separability and minimizes intra-class variance of the feature samples with respect to corresponding class labels by the FLDA criterion.

Finally, instead of using the above class discriminative direction vector for dimensionality reduction, the present invention uses it to transform the data at hand (Eq. 9) enhancing their discriminative power, while maintaining their original dimensionality. In block 110, the invention trains a classifier using the new feature samples.

In some embodiments, the invention produces significant gains in face recognition performance over state-of-the-art and can be leveraged for building solutions based on face verification of interest to various end users. Further, since this a generalized feature transformation technique, it can be used in other machine learning applications, including but not limited to, speech, text and object classification problems. The feature transformation technique of the invention can also be applied to any classification task.

Figure 2:
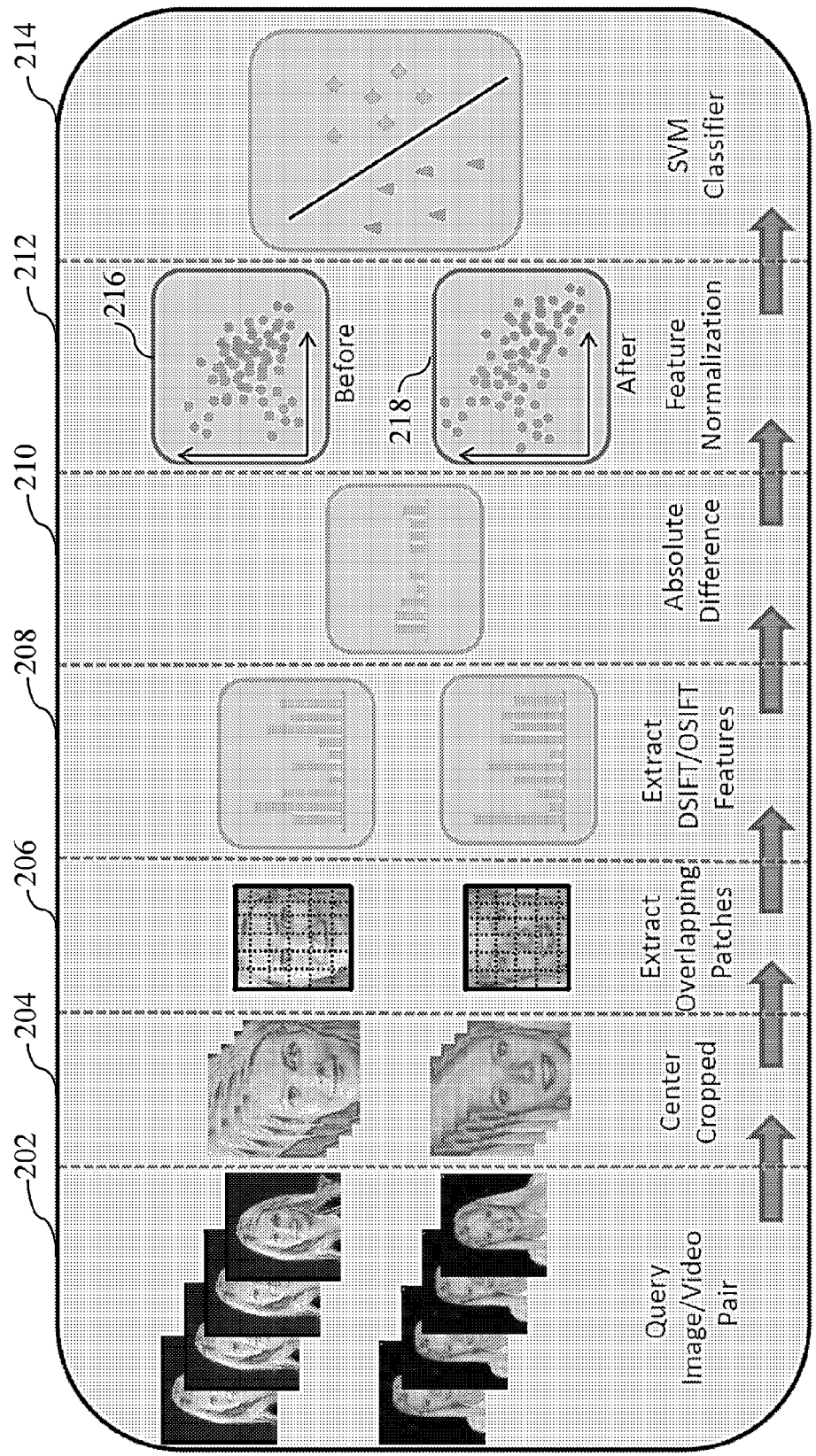
FIG. 2 is an exemplary pipeline flow, executed by one or more processors, according to some embodiments of the present invention.

FIG. 2 is an exemplary pipeline flow, executed by one or more processors, according to some embodiments of the present invention. Blocks 202-210 are related to receiving a data set and extracting features from the data set. In block 202, a data set, for example, including images or video is received. For instance, for the face verification problem at hand, the query could be a pair of images/videos. Labelled Faces in the Wild (LFW) and Youtube Faces in the Wild (YFW) are publically available datasets to address the problem of unconstrained face verification (with Aging, Pose, Illumination and Expression, A-PIE variations) in the wild. LFW contains a total of 13, 233 web images of 5,479 subjects, where the number of images per subject varies from 1 to 530. The set of 6000 randomly selected image pairs is divided into 10 different partitions such that each partition contains 300 matched and 300 mismatched pairs. YFD, on the other hand, consists of 3,425 videos if 1, 595 different individuals, with an average of 2.15 videos per individual where the average length of a video clip is 181.3 frames (@24 fps). Each of the 10 folds contains 250 matched and 250 mismatched pair of face videos. Further, the train and test pairs are mutually exclusive across all the folds.

In block 204, the invention uses the roughly aligned images from the datasets and resizes the images/videos to, for example, 250×250 and then center-crops to, for example, 150×150. In block 206 and 208, the invention extracts low-level features such as Scale Invariant Feature Transform (SIFT) features represented by corresponding Fisher Vectors. In some embodiments, the invention uses VLFeat encoding scheme for feature extraction, which trains a Gaussian Mixture Model (GMM) to model the probability density of the words/clusters in the vocabulary. This encoding scheme is described in "Vedaldi 2008 VLFeat: An Open and Portable Library of Computer Vision Algorithms," the entire contents of which is hereby expressly incorporated by reference. The well-known Fisher Vector-based feature encoding captures the average first and second order differences between image descriptors and the centers of a GMM. It will be recognized by those skilled in the art that SIFT is one of the de-facto gradient-based low-level image descriptor and Fisher Vector is a commonly used feature representation In block 210, each pair of face image/video representations is used to obtain an absolute difference vector, which is in turn used to train a Support Vector Machine (SVM) classifier in block 214. The SVM classifier learns a hyperplane discriminating the two classes (matched and mismatched pair) in a max-margin framework. In block 212, feature transformation is performed on the original features 216 to obtain new discriminative feature samples 218.

In some embodiments, as the training set is split to learn the projection ($\omega^*$ in eq. 6) and projects only the rest of the training set, a substantial amount of floating point computations ($O(n^2)$) are saved at both training and testing stages. (Eq. 6).

Turning now to mathematical support for the above processes, consider a binary class framework with given data pairs $$D=\{x_i, y_i\}_{i=1}^{N} \quad (1)$$

where each $x_i \in \Re^D$ is a D-dimensional data vector (for example, a high-dimensional Fisher Vectors used as the baseline data vector) and $y_i \in \{-1, 1\}$ is its corresponding binary label.

The goal is to find a direction in the feature space which maximizes the between class (inter-class) separability and suppresses the variance of the given data in the other directions. This serves two purposes. First, the noise in the data is suppressed. Second, not completely omitting the other directions prevents loss of information. Given this goal, Fisher's Linear Discriminant Analysis (FLDA) is a well-known approach that aims at achieving this criteria. The objective function of FLDA implicitly finds a projection vector along which data vectors of the same class have similar scores.

Also, assume that the data vectors are mean centered, then the FLDA criteria results in an optimal direction $\omega^*$ given by $$\omega^* \propto S^{-1}(\mu_1 - \mu_{-1}) \quad (2)$$

where S is the data covariance matrix and $\mu_1$ and $\mu_{-1}$ are mean vectors for class 1 and $-1$ respectively.

The same solution can be achieved by the following least squares minimization $$\omega^* = \operatorname*{argmin}_{\omega} \| t - X\omega \|^2, \quad (3)$$

where $X \in \Re^{N \times D}$ is the data matrix, with each row as one sample, and $t \in \Re^N$ is the corresponding signed target vector, whose components are given by $$t_i = \begin{cases} -\dfrac{2N_i}{N}, & \text{if } y_i = -1. \\ \dfrac{2N_{-1}}{N}, & \text{otherwise.} \end{cases} \quad (4)$$

where N and $N_{-1}$ are the number of positive and negative class samples respectively.

The solution to the above minimization results in $\omega^* = (X^T X)^{-1} X^T t$. Notice that $$X^T X = (N-1)S \text{ and } X^T t = \frac{2N_1 N_{-1}}{N}(\mu_1 - \mu_{-1}),$$

which gives the same direction as the original FLDA optimization. Hence, Eqs. (3) and (4) can be combined to find the optimal direction that meets the FLDA criterion. In some embodiments, this alternate optimization method is used, because of the computational efficiency of the quadratic program.

If the data is not mean centered, one possible way to take this into account is to solve the following objective function $$(\omega^*, b^*) = \operatorname*{argmin}_{\omega, b} \| t - X\omega - b\mathbf{1} \|^2 \quad (5)$$

where b is the scalar bias.

An $l^2$ regularization is performed on $\omega$ and b to simplify the optimization using the following equivalent formulation:

$$\tilde{\omega}^* = \operatorname*{argmin}_{\tilde{\omega}} \| t - \tilde{X}\tilde{\omega} \|^2 + \lambda \| \tilde{\omega} \|^2 \quad (6)$$

where $\tilde{X} = [X \mathbf{1}]$ and $\tilde{\omega} = [\omega^T b]^T$. The above optimization is essentially equivalent to regularized linear discriminant analysis, which is useful for handling degenerate (low-rank) data.

Finally, instead of using the above class discriminative direction $\omega^*$ for dimensionality reduction, the invention uses this optimal direction for normalizing the data at hand. Since $\omega^*$ represents the class discriminative direction, the relative variance of the data needs to be increased along this direction while suppressing other directions in the original feature space. To achieve this, consider any unitary matrix $V \in \Re^{D \times D}$ with $\omega^*$ fixed as its first column vector (without any loss of generality).

The columns of V essentially represent a basis of the feature space. Then, any data vector x is normalized as follows:

$$x_{norm} = (V \Sigma V^T) x \quad (7)$$

where Σ is a diagonal matrix whose elements are given by:

$$\sum_{ii} = \begin{cases} 1 = \alpha & \text{if } i = 1 \\ 1, & \text{otherwise} \end{cases}, \quad (8)$$

where α is a tunable positive scalar. It is straightforward to see that equation (7) can be reformulated as:

$$x_{norm} = (I + \alpha(\omega^* \omega^{*T}))x \quad (9)$$
$$= x + \alpha(x^T \omega^*)\omega^*,$$

which is a computationally more efficient representation. We call our proposed normalization formulation Class Discriminative Feature Transform (CDFT). Notice that there are two tunable parameters λ>0 and α>0 for the application of CDFT. However, in some embodiments, the regularization term λ (Eq. 6) is fixed to be a very small value (0.001) to avoid degenerate cases. Changing this value does not affect the results significantly. Accordingly, only a needs to be tuned in practice. On a single node, in some embodiments, the optimization takes about 2 minutes to calculate the optimal transformation vector ω* for a set of 500 training samples, each being a 580,000-dimensional feature vector.

Since the objective function is a quadratic program, the conjugate gradient descent is used for optimization. The pseudocode is given below. In some embodiments, a Conjugate Gradient method for solving Eq. (6) is as follow:

---
Algorithm 1 Conjugate Gradient method for Solving (6)
---
INPUT: y, $\tilde{X}$, λ = 0.001
INITIALIZE:
$\tilde{w} = 0$, $p = r_1 = 2(\tilde{X}^T t - \tilde{X}^T \tilde{X} \tilde{w} + \lambda \tilde{w})$,
while not converged or max iteration reached do
  1. $a_1 \leftarrow (r_1^T r_1)/(2(\tilde{X}p)^T(\tilde{X}p) + 2\lambda p^T p)$
  2. $\tilde{w} \leftarrow \tilde{w} + a_1 p$
  3. $r_2 \leftarrow r_1 - 2a_1(\tilde{X}^T(\tilde{X}p) + \lambda p)$
  4. $a_2 \leftarrow (r_2^T r_2)/(r_1^T r_1)$
  5. $p \leftarrow r_2 + a_2 p$
  6. $r_1 \leftarrow r_2$
end while
$w \leftarrow \tilde{w}_{1:D}$
OUTPUT: $w \leftarrow w/\|w\|_2$

---

In this section, it is shown how the proposed CDFT affects distance computation using the widely used RBF (radial basis function) kernel. Let $x_{norm,1}$ and $x_{norm,2}$ be the normalized forms of any two data vectors $X_1$ and $X_2$. Then, the RBF kernel $\kappa(x_{norm,1}, x_{norm,2})$ between the two normalized vectors is given by:

$$\kappa = (x_{norm,1}, x_{norm,2}) = \exp\left(-\frac{\|x_{norm,1} - x_{norm,2}\|^2}{2\sigma^2}\right) \quad (10)$$
$$= \exp\left(-\frac{\|x_1 - x_2 + \alpha(\omega^{*T}(x_1 - x_2)\omega^*)\|}{2\sigma^2}\right)$$
$$= \exp\left(-\frac{\|x_1 - x_2\|^2 + 2(\alpha^2 + \alpha)(\omega^{*T}(x_1 - x_2))^2}{2\sigma^2}\right)$$
$$= \exp\left(-\frac{\|x_1 - x_2\|^2}{2\sigma^2}\right)\exp\left(-\frac{(\omega^{*T}(x_1 - x_2))^2}{2\tilde{\sigma}^2}\right)$$

where $\tilde{\sigma} = \frac{\sigma}{\sqrt{2(\alpha^2 + \alpha)}}$.

Thus, for an RBF kernel, the proposed metric learning scales the original kernel with another kernel which depends on the estimated signed label values of the two data vectors. This can then be used for training kernel support vector machines (SVM).

The transformation vector (matrix) of the present invention enhances those directions in the feature space that would increase the separation between inter-class quality mean vectors which in turn is used to project the initial feature vectors enhancing their discriminativity (Eq. 9).

By finding this projection matrix, significant improvement is achieved in the face verification pipeline. This produces fast and accurate results for unconstrained face verification in the training dataset, for example, in videos in the wild (YouTube™ Faces in the Wild Dataset) and further improves verification results for in images (Labeled Faces in the Wild Dataset).

In some embodiments, the conventional Fisher LDA process entails the following steps:
Given a dataset $$D = \{x_i, y_i\}_{i=1}^n, x_i \in \mathcal{R}^d, y_i \in \{-1, 1\}$$

the objective is to suppress those directions in the feature space which are not discriminative
FLDA Solution: The transformation matrix obtained is:

$$G \propto S_t^{-1}(c^{(1)} - c^{(2)}),$$

where $c^{(1)}$ and $c^{(2)}$ are respectively the mean vectors of class 1 and 2. S is the data covariance matrix
For Fisher Vector (d≈10), taking the data invariance is not computationally feasible
Solution: Linear Regression with class label as the output is equivalent to Fisher LDA
In some embodiments, the Least Squares LDA approach entails the following steps:
Assume that both $\{x_i\}$ and $\{y_i\}$ are mean centered, it follows that $y_i \in \{-2n/n, 2n_1/n\}$ where $n_1$ and $n_2$ denote number of samples from each class respectively
Objective function:

$$\underset{w}{\text{argmin}} \|y - Xw\|^2$$

Solution: $w = (XX^T)^{-1}Xy$
It can be shown that $$XX^T = nS_t \text{ and } Xy = 2n_1n_2(c^{(1)} - c^{(2)})/n$$
$$\text{So, } w = 2n_1n_2S_t^{-1}(c^{(1)} - c^{(2)})/n$$

Hence, 'w' learned by optimizing least square error can instead be used for the FLDA criterion This approach can be used for extending the LDA approach to high dimensional datasets where taking the inverse of the covariance matrix might be very computationally expensive.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for face or speech recognition comprising:
   receiving an image or a voice data set including original face or speech feature samples with corresponding class labels of different categories of a face or a speech;
   splitting the image or voice data set into an image or voice direction optimization set and an image or voice training set;
   using the image or voice direction optimization set to calculate an optimum transformation vector that maximizes inter-class separability and minimizes intra-class variance of the original face or speech feature samples with respect to corresponding class labels;
   using the optimum transformation vector to transform the original face or speech feature samples of the image or voice data set to new face or speech feature samples with enhanced discriminative characteristics by increasing a relative variance of the image or voice data along a direction of the direction optimization set;
   training a classifier using the new face or speech feature samples;
   extracting face or speech features from the trained classifier to recognize the face or the speech, wherein the method is performed by one or more processors, and wherein
   the optimum transformation vector maximizes inter-class separability and minimizes intra-class variance of the feature samples with respect to corresponding class labels, and wherein the optimum transformation vector is calculated by:
   learning a class discriminative projection vector using a Fisher Linear Discriminant Analysis (FLDA) criterion;
   projecting the original face or speech feature samples such that the feature directions along the projection vector are maximized while other directions are minimized while maintain the dimensionality to obtain new discriminative features; and
   learning a Support Vector Machine (SVM) based classifier on said new discriminative features.

2. The method of claim 1, wherein a conjugate gradient descent based least square method is used to calculate the optimum transformation vector.

3. The method of claim 1, wherein the optimum transformation vector is used to transform the original face or speech feature samples of the data set while maintaining the same dimensionality.

4. A non-transitory computer storage medium for face or speech recognition having stored thereon a plurality of programming instructions that when executed by a computer perform:
   receiving an image or a voice data set including original face or speech feature samples with corresponding class labels of different categories of a face or a speech;
   splitting the image or voice data set into an image or voice direction optimization set and Hall an image or voice training set;
   using the image or voice direction optimization set to calculate an optimum transformation vector that maximizes inter-class separability and minimizes intra-class variance of the original face or speech feature samples with respect to corresponding class labels;
   using the optimum transformation vector to transform the original face or speech feature samples of the image or voice data set to new face or speech feature samples with enhanced discriminative characteristics by increasing a relative variance of the image or voice data along a direction of the direction optimization set;
   training a classifier using the new face or speech feature samples;
   extracting face or speech features from the trained classifier to recognize the face or the speech, wherein the method is performed by one or more processors, and wherein
   the optimum transformation vector maximizes inter-class separability and minimizes intra-class variance of the feature samples with respect to corresponding class labels, and wherein the optimum transformation vector is calculated by:
   learning a class discriminative projection vector using a Fisher Linear Discriminant Analysis (FLDA) criterion;
   projecting the original face or speech feature samples such that the feature directions along the projection vector are maximized while other directions are minimized while maintain the dimensionality to obtain new discriminative features; and
   learning a Support Vector Machine (SVM) based classifier on said new discriminative features.

5. The non-transitory computer storage medium of claim 4, wherein a conjugate gradient descent based least square method is used to calculate the optimum transformation vector.

6. The non-transitory computer storage medium of claim 4, wherein the optimum transformation vector is used to transform the original face or speech feature samples of the data set while maintaining the same dimensionality.

* * * * *